United States Patent
Karacali-Akyamac (10) Patent No.: US 8,284,259 B2
(45) Date of Patent: Oct. 9, 2012

(54) POLICY-BASED VIDEO QUALITY ASSESSMENT

(75) Inventor: Bengi Karacali-Akyamac, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 465 days.

(21) Appl. No.: 12/565,054

(22) Filed: Sep. 23, 2009

(65) Prior Publication Data

US 2011/0069177 A1    Mar. 24, 2011

(51) Int. Cl.
*H04N 17/00* (2006.01)
(52) U.S. Cl. ........................................................ 348/180
(58) Field of Classification Search .................. 348/180, 348/192–193, 194, 189; 704/216; 382/112
See application file for complete search history.

(56) References Cited

U.S. PATENT DOCUMENTS

| | | | |
|---|---|---|---|
| 7,715,592 B1 * | 5/2010 | Hollier et al. | 382/112 |
| 2006/0093094 A1 * | 5/2006 | Xing et al. | 379/1.02 |
| 2007/0112563 A1 * | 5/2007 | Krantz et al. | 704/216 |
| 2007/0116118 A1 | 5/2007 | Kostrzewski et al. | |
| 2011/0001833 A1 * | 1/2011 | Grinkemeyer et al. | 348/192 |

FOREIGN PATENT DOCUMENTS

EP    1855418 A1    11/2007

OTHER PUBLICATIONS

Lewney, Dr. Mark, "GB Application No. GB1005141.5 Search Report Jul. 29, 2010",, Publisher: UK IPO, Published in: GB.

* cited by examiner

*Primary Examiner* — Paulos Natnael (57) ABSTRACT

A method to determine when to compare original data (such as the original image) to rendered data (such as the rendered image) for the purpose of determining the fidelity of without some of the disadvantages of the prior art is disclosed. This is done by assessing the quality of service of a network path at a given time or by assessing the conditions of the network path over time and deciding specific times at which to test.

13 Claims, 5 Drawing Sheets

POLICY-BASED VIDEO QUALITY ASSESSMENT

FIELD OF THE INVENTION

The present invention relates to telecommunications in general, and, more particularly, to transmission of data across a network.

BACKGROUND OF THE INVENTION

Video signals, such as high-definition television (HDTV) signals, are increasingly being transmitted over networks that have no quality-of-service guarantees, such as Internet Protocol networks. Consequently, there is information loss as video streams across these networks.

In a movie theater, a film reel rolls in front of a light at (usually) 24 frames per second. If someone were to look at any single frame in the film, he or she would see a complete picture. Film is like a "flip-book" in which each drawing is slightly different than the one before it. Digital video works differently.

Digital video is compressed in order to get the highest quality of video with the smallest amount of data possible. Frequently, video compression systems work by sending a single "frame" of a video as an image and—instead of sending the entire image of the next frame—the system sends only the difference between the single image and the image preceding it. By sending only the difference between the two images, the amount of data required to transmit the next image is less than sending a whole image.

When packets of data are lost in a network, often the instructions of how to take one image and add the differences between images are lost. This leads to images being rendered improperly. If the amount of data loss is small, then the difference between the original image and the rendered image that a viewer sees may be too small for an individual to notice. Even if the differences are noticeable, a person would probably be unable to quantify the differences between the two images.

For the purpose of this specification, the term "fidelity" is defined as the degree to which a network path accurately reproduces the sound or image of its input information.

For example and without limitation, the differences in the original image and the rendered image are a result of losses of fidelity. Loss of fidelity may result from various issues, for example and without limitation, the quality of service along a network path, other network conditions, losses inherent to compression, problems with compressing the information, etc. The data such may be, for example and without limitation, video, images, telephony, streaming audio, any time-sensitive data, any quality-of-service sensitive data, etc.

For the purposes of this specification, a "network path" is defined as a pair of source and destination nodes in a network.

The service provided by a network path is characterized by its "quality of service," which, for the purposes of this specification, is defined as a function of the bandwidth, error rate, and latency, and their time derivatives, of the network path.

For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per bit or packets lost per packet. For the purposes of this specification, the "latency" from one node to another is defined as an indication of how much time is required to transport information from one node to another. Typically, latency is measured in seconds.

There exist several methods to determine the fidelity. There are subjective techniques, for example and without limitation, asking an individual, asking a group and taking an average ("mean opinion score"), etc. There are also objective techniques. These techniques fall into three main categories: full-reference, reduced reference, and no-reference techniques.

In full reference techniques, the original image is compared to the received image using image processing techniques. Hence, full reference techniques require access to both the original transmitted and the received video sequences. These measurements are computationally intensive.

Reduced reference techniques extract various features from both the original and the distorted video sequences and compare the extracted features of the original and the distorted images to each other. While the comparison of only the extracted features reduces the computational overhead, it may still be computationally intensive to extract the features from the source video. Additionally, the extracted features of the original image would still need to be sent across the network and synchronized to the received image. For off-line network assessment, pre-defined set of images can be used.

No-reference techniques use only the received distorted image. These techniques can be pixel-based or bitstream based and are more suitable for both in-service monitoring and off-line network assessment for video quality. Pixel-based techniques look for known distortions in the images to assess quality. However, they cannot handle video sequences with unanticipated distortions. Bitstream-based techniques are computationally lighter since they do not require decoding. Assessment of video quality is computationally simple. However, additional upfront computation is required.

All of the above methods require large amounts of computation. Because the computational requirements of all these methods are high, they can only be used sparingly without causing undue burdens on processing resources.

SUMMARY OF THE INVENTION

The present invention is a method to determine when to compare original data (such as the original image) to rendered data (such as the rendered image) for the purpose of determining the fidelity of without some of the disadvantages of the prior art. This is done by assessing the quality of service of a network path at a given time or by assessing the conditions of the network path over time and deciding specific times at which to test.

In accordance with the illustrative embodiment of the present invention, the greater the changes in network conditions, the greater the frequency of testing. Consequently, when changes in network conditions are less, testing occurs less frequently. Also in accordance with the illustrative embodiment of the present invention, the worse network conditions are, the more frequently testing is performed. Because the fidelity of information across a network path is affected by the quality of service along that network path.

Different tests of fidelity can be performed or the same test can be performed each time.

DETAILED DESCRIPTION

Figure 1:
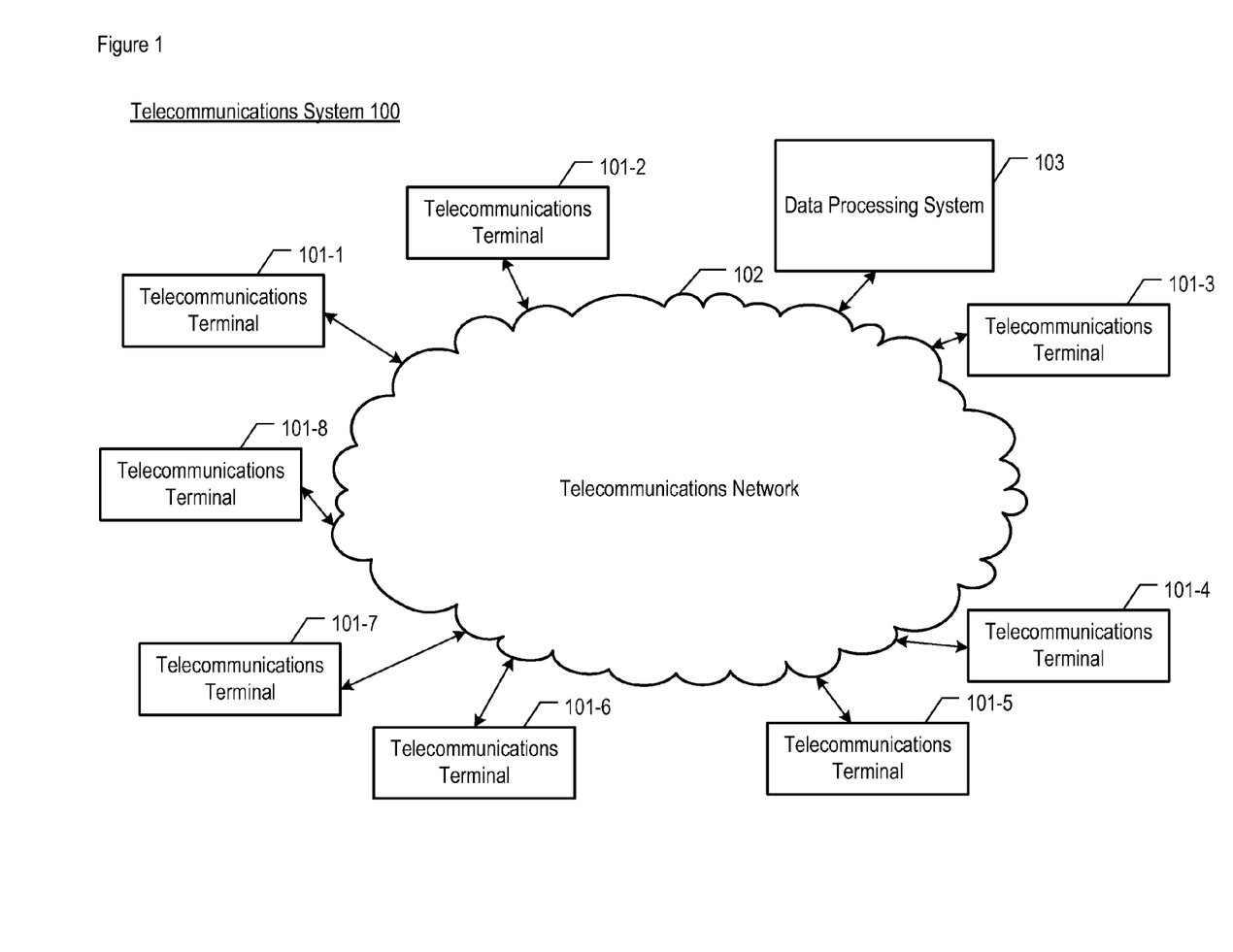
FIG. 1 depicts a schematic diagram of a portion of telecommunications system 100 in accordance with the illustrative embodiment of the present invention.

FIG. 1 depicts a schematic diagram of a portion of telecommunications system 100 in accordance with the illustrative embodiment of the present invention. Telecommunications system 100 comprises telecommunications terminals 101-1 through 101-8, telecommunications network 102, and data processing system 103.

Although telecommunications network comprises eight (8) telecommunications terminals, it will be clear to one skilled in the art, after reading this disclosure how to make and use alternative embodiments of the present invention in which there are any number of telecommunications terminals.

Although telecommunications network comprises one telecommunications network, it will be clear to one skilled in the art, after reading this disclosure how to make and use alternative embodiments of the present invention in which there are any number of telecommunications networks.

Although telecommunications network comprises one data processing system, it will be clear to one skilled in the art, after reading this disclosure, how to make and use alternative embodiments of the present invention in which there are any number of data processing centers.

Telecommunications terminals 101-1 through 101-8 are hardware and software for communicating on a telecommunications network. In accordance with the illustrative embodiment of the present invention, telecommunications terminals 101-1, through 101-8 can be either wireline terminals or wireless terminals, or a combination of both. It will be clear to one skilled in the art, after reading this disclosure, how to make and use telecommunications terminals 101-1 through 101-8.

In accordance with the illustrative embodiment of the present invention, telecommunications terminals 101-1 through 101-8 are capable of transmitting, receiving, rendering, and displaying data (including video), but it will be clear to one skilled in the art after reading this disclosure, how to make and use alternative embodiments of the present invention, in which telecommunications terminals 101-1 through 101-8, for example and without limitation, transmit and receive data and video signals without displaying them themselves, only receive data, etc. In accordance with the illustrative embodiment of the present invention, telecommunications terminals 101-1 through 101-8 are devices such as televisions, set-top boxes, personal computers, mobile telecommunications terminals, such as mobile telephones or smartphones, etc.

Telecommunications network 102 is a private network, but it will be clear to those skilled in the art, after reading this disclosure, how to make and use alternative embodiments of the present invention in which telecommunication network 102 is another network, for example and without limitation, the Public Switched Telephone Network, the Internet, a private data network, a community access television network, a cable television system, a fiber optic data network, a satellite network, etc.

Data processing system 103 is hardware and software for distributing data across telecommunications network 102. It will be clear to one skilled in the art, after reading this disclosure, how to make and use data processing system 103.

Figure 2:
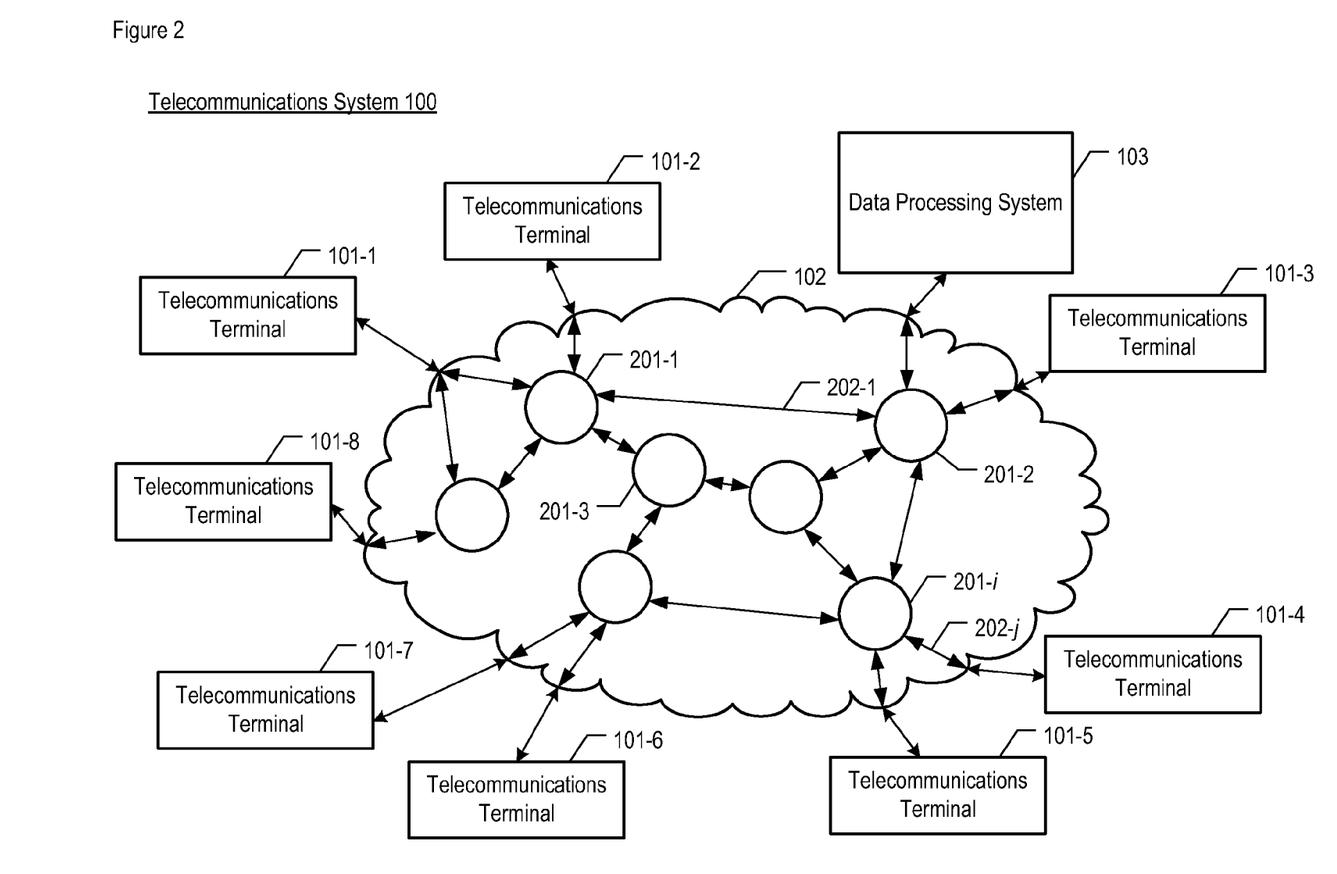
FIG. 2 depicts a schematic diagram of a portion of telecommunications system 100 in accordance with the illustrative embodiment of the present invention.

FIG. 2 depicts a schematic diagram of a portion of telecommunications system 100 in accordance with the illustrative embodiment of the present invention. Telecommunications system 100 comprises telecommunications terminals 101-1 through 101-8, telecommunications network 102, data processing system 103, communication node 201-1 through 201-$i$ where i can be between 1 and I, and communication link 202-1 through 202-$j$ where j can be between 1 and J.

Although telecommunications network comprises seven (7) communication nodes, it will be clear to one skilled in the art, after reading this disclosure, how to make and use alternative embodiments of the present invention in which there are any number of communication nodes.

Although telecommunications network comprises nineteen (19) communication links, it will be clear to one skilled in the art, after reading this disclosure, how to make and use alternative embodiments of the present invention in which there are any number of communication links.

Telecommunications network 102 comprises a plurality of nodes and their physical interconnections, arranged in the topology shown. It will be clear to those skilled in the art, however, after reading this specification, how to make and use alternative embodiments of the present invention with networks that comprise any number of nodes and have any topology.

Each node in telecommunications network 102 is capable of receiving a packet and of forwarding that packet to another node, in well-known fashion, based on the destination address in the packet. For example, when node 201-1 receives a packet from source node telecommunications terminal 201-1, which packet contains node telecommunications terminal 101-3 as its destination address, node 201-1 must decide which of its adjacent nodes to forward the packet.

When all of the resources in a network are functioning and there is little congestion, each node forwards a packet to the node listed as the entry for the preferred next node and the packet progresses from one preferred next node to the next and the next and so on until it reaches its destination node.

In accordance with the illustrative embodiment of the present invention, a network path may comprise the path data takes from data processing system 103 to a given telecommunications terminal (such as telecommunications terminal 101-8). For example, and without limitation, data may travel from data processing system 103 to telecommunications terminal 101-8 along a network path that comprises link 202-1 or instead may travel along a network path that travels instead to node 201-3. It will be clear to one skilled in the art, after reading this disclosure, how to make and use alternative embodiments of the present invention in which there are any number of network paths between the data processing system 103 and any telecommunications terminal and between any two telecommunications terminals.

It will be clear to one skilled in the art, after reading this disclosure, how to make and use alternative embodiments of the present invention in which information is divided into any number of packets, each of which is sent along a different network path.

Figure 3:
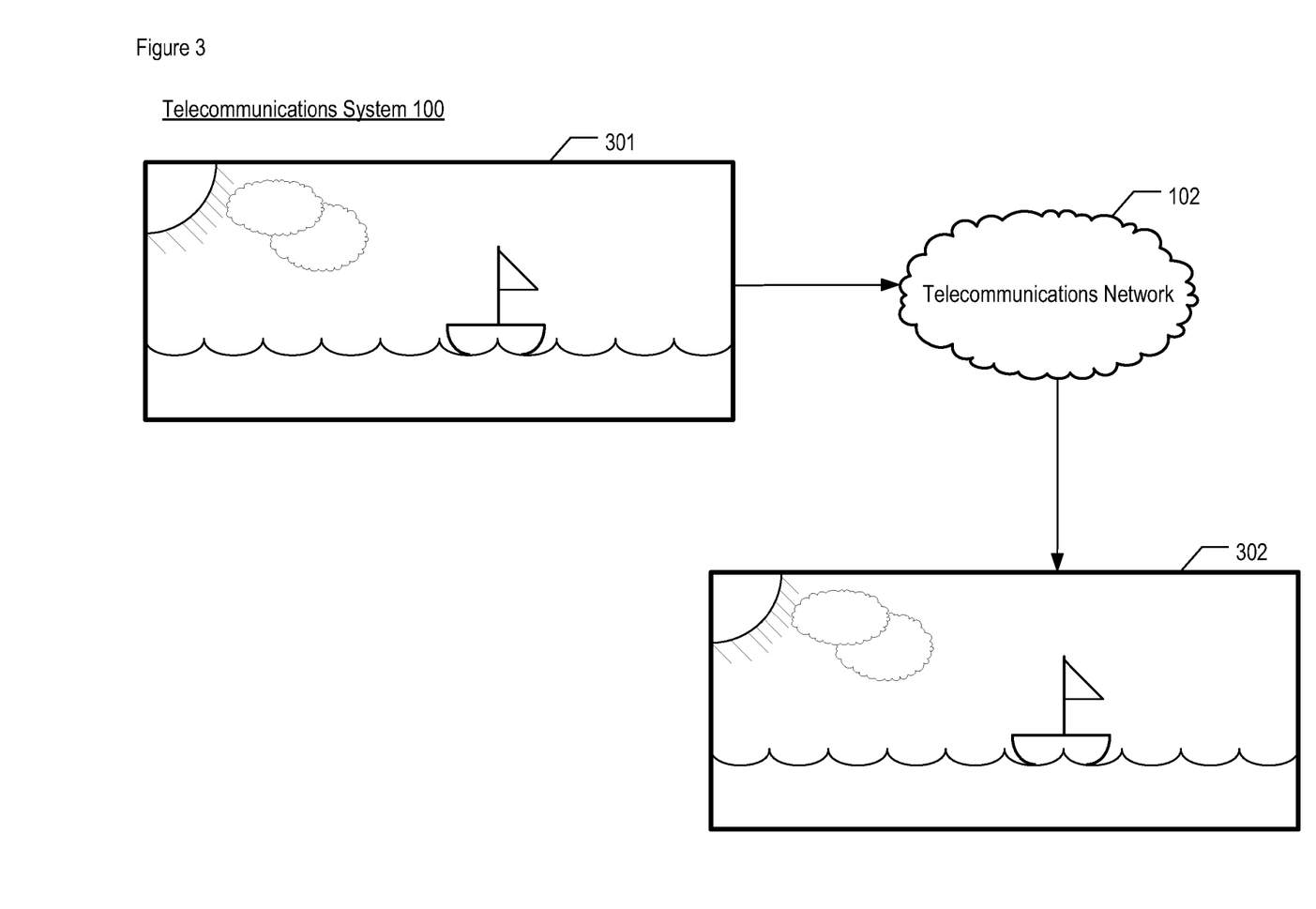
FIG. 3 depicts a schematic diagram of a portion of telecommunications system 100 in accordance with the illustrative embodiment of the present invention.

FIG. 3 depicts a schematic diagram of a portion of telecommunications system 100 in accordance with the illustrative embodiment of the present invention. Telecommunications system 100 comprises original image 301 to be transmitted from data processing system 103, telecommunications network 102, and received image 302 that is received at a given telecommunications terminal.

Although FIG. 3 depicts only one original image, it will be clear to one skilled in the art, after reading this disclosure, how to make and use alternative embodiments of the present invention in which there are any number of images transmitted.

Although FIG. 3 depicts only one received image, it will be clear to one skilled in the art, after reading this disclosure, how to make and use alternative embodiments of the present invention in which there are any number of images received.

Although FIG. 3 depicts only one telecommunications terminal receiving an image, it will be clear to one skilled in the art, after reading this disclosure, how to make and use alternative embodiments of the present invention in which there are any number of telecommunications terminals.

Although FIG. 3 depicts only one (1) telecommunications network, it will be clear to one skilled in the art, after reading this disclosure, how to make and use alternative embodiments of the present invention in which any number of telecommunications networks are used.

Although FIG. 3 depicts only one (1) data processing system, it will be clear to one skilled in the art, after reading this disclosure, how to make and use alternative embodiments of the present invention in which there are any number of data processing systems.

In accordance with the illustrative embodiment of the present invention, original image 301 is transmitted from data processing system 103 across telecommunications network 102 and is received as received image 302.

In accordance with the illustrative embodiment of the present invention, original image 301 is a frame of video. However, it will be clear to one skilled in the art, after reading this disclosure, how to make and use alternative embodiments of the present invention in which original image 301 is any information.

In accordance with the illustrative embodiment of the present invention, received image 302 is a frame of video. However, it will be clear to one skilled in the art, after reading this disclosure, how to make and use alternative embodiments of the present invention in which received image 302 is another form of data.

In accordance with the illustrative embodiment of the present invention, ideally original image 301 and received image 302 are exactly identical. However, because of various factors, for example and without limitation, quality of service across a network path in telecommunications network 102, packet loss, compression problems, etc. received image 302 may differ from original image 301.

Tests can be performed to determine the fidelity from original image 301 to received image 302. In accordance with the illustrative embodiment of the present invention, these tests include, for example and without limitation, objective tests such as the video quality score (VQM), subjective tests such as bitstream-based tests, or some combination of the two tests. It will be clear to one skilled in the art, after reading this disclosure, how to make and use alternative embodiments of the present invention that perform these tests.

Figure 4:
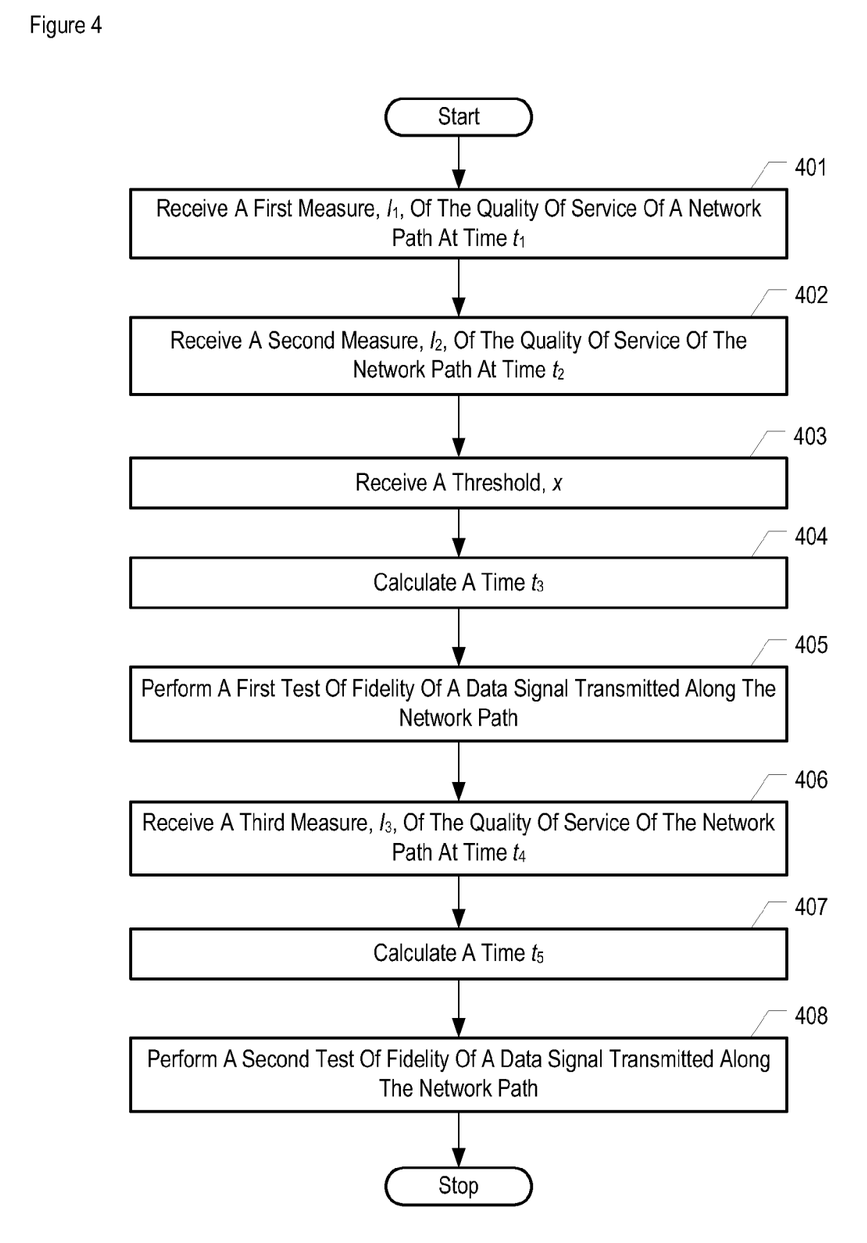
FIG. 4 depicts a flowchart of the salient tasks associated with the operation of the illustrative embodiment of the present invention.

FIG. 4 depicts a flowchart of the salient tasks associated with the operation of the illustrative embodiment of the present invention.

In accordance with the illustrative embodiment of the present invention, the tasks outlined in FIG. 4 are performed at data processing system 103. However, it will be clear to one skilled in the art, after reading this disclosure, how to make and use other implementations of the present invention in which some or all of the steps are performed by another device, for example, and without limitation, a telecommunications terminal, a separate data processing system, a television, a server, etc.

Although, in accordance with the illustrative embodiment of the present invention, the tasks outlined in FIG. 4 are performed only once, it will be clear to one skilled in the art, after reading this disclosure, how to make and use alternative embodiments of the present invention in which the tasks are performed any number of times, for example, and without limitation, the tasks are performed on a continuous basis.

Although, in accordance with the illustrative embodiment of the present invention, the tasks outlined in FIG. 4 are performed on only one network path, it will be clear to one skilled in the art, after reading this disclosure, how to make and use alternative embodiments of the present invention in which the tasks are performed any number of network paths. For example, and without limitation, these tasks may be performed on multiple network paths in a given telecommunications network in order to determine the quality of service across several network paths.

At task 401, a first measure, $I_1$, of the quality of service of a network path is received at time $t_1$.

In accordance with the illustrative embodiment of the present invention, time $t_1$, is a calendrical time. However, it will be clear to one skilled in the art, after reading this disclosure, how to make and use alternative embodiments of the present invention in which the time is represented in another fashion.

For the purposes of the specification and claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 pm to 9:00 pm, etc.).

Although, accordance with the illustrative embodiment of the present invention, times $t_1$, $t_2$, $t_3$, and so on are in order such that $t_2$ comes after $t_1$, it will be clear to one skilled in the art, after reading this disclosure, how to make and use alternative embodiments of the present invention in which the actions are performed in a different time sequence. For example, and without limitation, the actions may be performed simultaneously.

At task 402, a second measure, $I_2$, of the quality of service of a network path is received at a time $t_2$.

At task 403, a threshold, x, is received. In accordance with the illustrative embodiment of the present invention, the threshold, x, is a value of quality of service that is compared against the measured quality of service. For example, and without limitation, x is compared with values of $I_1$, $I_2$, $I_3$, or any measure of quality of service.

Although, in accordance with the illustrative embodiment of the present invention, the threshold is received at the same time or after the first measure, $I_1$, is received, it will be clear to one skilled in the art, after reading this disclosure, how to make and use alternative embodiments of the present invention in which x is received at any time, for example, and without limitation, x is received prior to the initiation in the process, x is an a priori value, x is a value that is variable, x is a value set relative to traffic on the network path, etc.

At task 404, a time $t_3$ is calculated. This step is further detailed in FIG. 5a and FIG. 5b.

At task 405, a first test of fidelity of a data signal transmitted along the network path is performed. In accordance with the illustrative embodiment of the present invention, the test may be an objective test, a subjective test, or some combination thereof.

At task 406, a third measure, $I_3$, of the quality of service of a network path, is received at a time $t_4$.

At task 407, a time $t_5$ is calculated. Although, in accordance with the illustrative embodiment of the present invention, this calculation is done in a manner like that at task 403, it will be clear to one skilled in the art, after reading this disclosure, how to make and use alternative embodiments of the present invention in which a different calculation is used at task 406.

At task 408, a second test of fidelity of a data signal transmitted along the network path is performed. Although, in accordance with the illustrative embodiment of the present invention, this test is performed in a manner like that at task 404, it will be clear to one skilled in the art, after reading this disclosure, how to make and use alternative embodiments of the present invention in which a different test is used at task 407.

Although, in accordance with the illustrative embodiment of the present invention, two (2) tests of fidelity are performed, it will be clear to one skilled in the art, after reading this disclosure, how to make and use alternative embodiments of the present invention in which any number of tests are performed.

It will be clear to one skilled in the art, after reading this disclosure, how to make and use other implementations of the present invention in which one or more of the steps are omitted or are performed in a different order than the one presented or simultaneously.

Figure 5A:
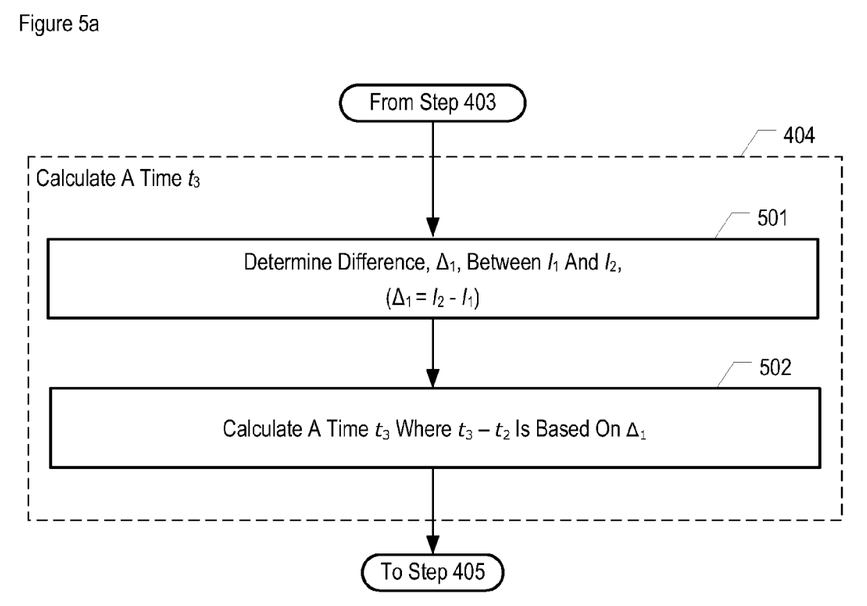
FIG. 5a depicts a flowchart of the salient tasks associated with the operation of task 403 in accordance with the illustrative embodiment of the present invention.

FIG. 5a depicts a flowchart of the salient tasks associated with the operation of task 404 in accordance with the illustrative embodiment of the present invention.

At task 501, the difference between $I_1$ and $I_2$, $\Delta_1$ is determined. In accordance with the illustrative embodiment of the present invention, this determination is of the kind: $\Delta_1 = I_2 - I_1$.

At task 502, a time $t_3$ where $t_3 - t_2$ is based on $\Delta_1$ is calculated. In accordance with the illustrative embodiment of the present invention, this is done by determining the magnitude of the difference between the first measure, $I_1$ and the second measure, $I_2$.

In accordance with the illustrative embodiment of the present invention, the greater the magnitude of $\Delta_1$, the less time passes between $t_3$ and $t_2$. Also, in accordance with the illustrative embodiment of the present invention, the lesser the magnitude of $\Delta_1$, the more time passes between $t_3$ and $t_2$.

It will be clear to one skilled in the art, after reading this disclosure, how to make and use other implementations of the present invention in which one or more of the steps are omitted or are performed in a different order than the one presented or simultaneously.

Figure 5B:
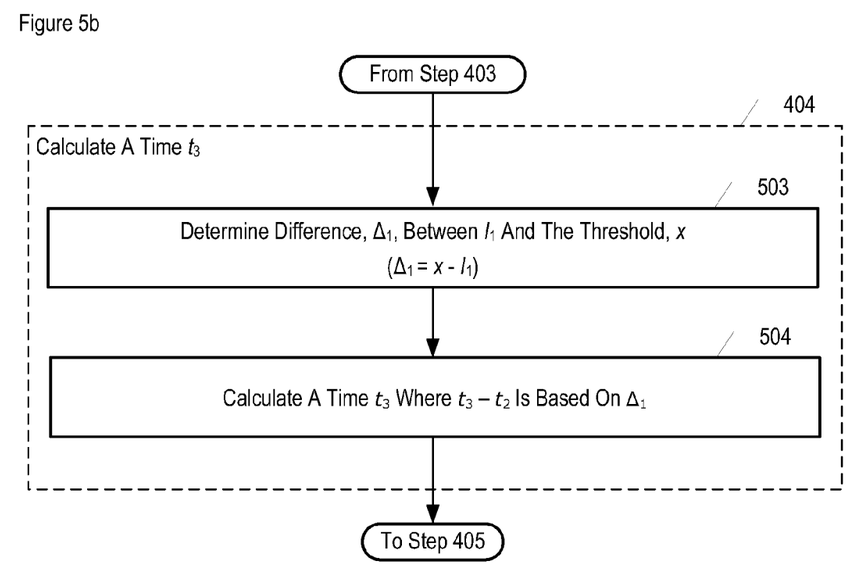
FIG. 5b depicts a flowchart of the salient tasks associated with the operation of task 403 in accordance with the illustrative embodiment of the present invention.

FIG. 5b depicts a flowchart of the salient tasks associated with the operation of task 404 in accordance with the illustrative embodiment of the present invention.

At task 503, the difference between $I_1$ and the threshold x, $\Delta_1$ is determined. In accordance with the illustrative embodiment of the present invention, this determination is of the kind: $\Delta_1 = x - I_1$.

At task 504, a time $t_3$ where $t_3 - t_2$ is based on $\Delta_1$ is calculated. In accordance with the illustrative embodiment of the present invention, this is done by determining the magnitude of the difference between the first measure, $I_1$ and a threshold, x. In accordance with the illustrative embodiment of the present invention, the greater the magnitude of $\Delta_1$, the less time passes between $t_3$ and $t_1$. Also in accordance with the illustrative embodiment of the present invention, if $\Delta_1$ is large, the time between $t_3$ and $t_1$ would be very small or effectively zero. In this case, testing may occur immediately or as soon as possible.

In accordance with the illustrative embodiment of the present invention, if $I_1 < x$, then the quality of service along the network path is below the threshold and that testing should occur more frequently. Also, in accordance with the illustrative embodiment of the present invention, if $I_1 \ll x$ (is much below the threshold value), then testing should occur immediately or as soon as possible. Conversely, if $I_1 > x$, then the quality of service along the network path is above the threshold and that testing need not occur as frequently.

It will be clear to one skilled in the art, after reading this disclosure, how to make and use alternative embodiments of the present invention, that perform task 504.

It will be clear to one skilled in the art, after reading this disclosure, how to make and use other implementations of the present invention in which one or more of the steps are omitted or are performed in a different order than the one presented or simultaneously.

What is claimed is:

1. A method comprising:
   receiving a first measure of a quality of service of a network path at a first time;
   receiving a second measure of the quality of service of the network path at a second time;
   testing, at a third time, a first fidelity of data transmitted along the network path, wherein the third time is based on a first difference between the first measure and the second measure;
   receiving a third measure of the quality of service of the network path at a fourth time; and
   testing, via a processor, a second fidelity of data transmitted along the network path, wherein the second fidelity of data transmitted is tested at a fifth time, and wherein the fifth time is based on a second difference between the third measure and the second measure.

2. The method of claim 1, wherein a time interval between the third time and the second time is decreased as the first difference between the first measure and the second measure is increased.

3. The method of claim 1, wherein testing the first fidelity determines a loss of fidelity due to the network path.

4. The method of claim 1, wherein the third time is also based on a third difference between the first measure and a threshold.

5. The method of claim 1, wherein the fifth time is also based on a fourth difference between the third measure and a threshold.

6. The method of claim h wherein a time interval between the third time and the second time is based on the second measure.

7. A method comprising:
   receiving a threshold x and a first measure of a quality of service of a network path at a first time;
   testing, at a second time, a first fidelity of data transmitted along the network path, wherein the second time is based on a first difference between the first measure and the threshold x;
   receiving a second measure of the quality of service of the network path at a third time; and testing, via a processor, a second fidelity of data transmitted along the network path, wherein the second fidelity is tested at a fourth time, and wherein the fourth time is based on a second difference between the second measure and the threshold x.

8. The method of claim 7, wherein a time interval between the first time and the second time increases when the first measure is above the threshold x.

9. The method of claim 7, wherein a time interval between the first time and the second time decreases when the first measure is below the threshold x.

10. The method of claim 7, wherein the fourth time is further based on a third difference between the second measure and the threshold x.

11. The method of claim 7, wherein testing the first fidelity is based on an objective test.

12. The method of claim 7, wherein testing the first fidelity is based on a subjective test.

13. A method comprising:
   receiving a first measure of a quality of service of a network path at a first time;
   receiving a second measure of the quality of service of the network path at a second time;
   testing, via a processor, a fidelity of data transmitted along the network path, wherein the fidelity is tested at a third time, wherein the third time is based on a difference between the first measure and the second measure, and wherein a time interval between the second time and the third time is based on the first measure and is increased when the first measure is below a threshold.

* * * * *